United States Patent
Kresse et al.

(10) Patent No.: US 9,056,605 B2
(45) Date of Patent: *Jun. 16, 2015

(54) SYSTEM FOR SELECTING A TRANSMISSION ECONOMY-BASED SHIFT SCHEDULE

(71) Applicant: Allison Transmission Inc., Indianapolis, IN (US)

(72) Inventors: John Kresse, Martinsville, IN (US); Robert Merrion, Pittsboro, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/030,448

(22) Filed: Sep. 18, 2013

(65) Prior Publication Data

US 2014/0019022 A1    Jan. 16, 2014

Related U.S. Application Data

(62) Division of application No. 13/242,477, filed on Sep. 23, 2011, now Pat. No. 8,775,041.

(60) Provisional application No. 61/389,414, filed on Oct. 4, 2010.

(51) Int. Cl.
*G06F 7/00* (2006.01)
*F16H 59/48* (2006.01)
(Continued)

(52) U.S. Cl.
CPC .............. *B60W 10/06* (2013.01); *F16H 59/18* (2013.01); *F16H 59/14* (2013.01); *F16H 59/48* (2013.01);
(Continued)

(58) Field of Classification Search
CPC .......... F16H 61/0204; F16H 2059/148; F16H 2059/183; F16H 2061/0015; F16H 2061/022; F16H 59/14; F16H 59/18; F16H 59/48; F16H 61/0213; F16H 61/204; B60W 10/06; B60W 10/11; H01H 1/50; H01H 1/502; H01H 31/003; H01H 33/125; H01H 33/6661
USPC ............. 701/52, 53, 54, 55, 56; 477/120, 900
See application file for complete search history.

(56) References Cited

U.S. PATENT DOCUMENTS 4,041,810 A     8/1977  Harmon et al.
4,079,708 A *   3/1978  Wieland et al. ............... 123/376
(Continued)

FOREIGN PATENT DOCUMENTS

JP         60143132 A     7/1985
JP         11063188 A     3/1999
JP      2001208194 A     8/2001

OTHER PUBLICATIONS

International Searching Authority, Written Opinion of the International Searching Authority, Apr. 27, 2012, 4 pages.

*Primary Examiner* — Fadey Jabr
*Assistant Examiner* — Angelina Shudy
(74) *Attorney, Agent, or Firm* — Taft Stettinius & Hollister LLP; Stephen Rost

(57) ABSTRACT

The present invention provides a method of selecting an economy mode shift schedule for a transmission coupled to a motor vehicle. The method includes calculating vehicle acceleration and determining a change in accelerator pedal position. Also, a net tractive effort force of the vehicle is determined for a current gear range of the transmission. Also, the method includes comparing the net tractive effort force for the current gear range to a maximum tractive effort force for a desired gear range and selecting the economy mode shift schedule for the transmission based on the comparison. The method further includes controlling shifting between one or more gear ranges of the transmission according to the economy mode shift schedule.

23 Claims, 6 Drawing Sheets

(51) Int. Cl.
  *B60W 10/06*  (2006.01)
  *F16H 61/02*  (2006.01)
  *B60W 10/11*  (2012.01)
  *F16H 59/18*  (2006.01)
  *F16H 59/14*  (2006.01)
  *F16H 61/00*  (2006.01)

(52) U.S. Cl.
  CPC ...... *F16H 61/0213* (2013.01); *F16H 2059/148* (2013.01); *F16H 2059/183* (2013.01); *F16H 2061/0015* (2013.01); *F16H 2061/022* (2013.01); *F16H 61/0204* (2013.01); *B60W 10/11* (2013.01)

(56) References Cited

U.S. PATENT DOCUMENTS

| | | | |
|---|---|---|---|
| 5,079,708 A * | 1/1992 | Brown | 701/72 |
| 5,341,703 A * | 8/1994 | Palansky et al. | 477/65 |
| 5,951,438 A | 9/1999 | Adachi et al. | |
| 8,332,108 B2 * | 12/2012 | Kresse et al. | 701/56 |
| 8,775,041 B2 * | 7/2014 | Kresse et al. | 701/56 |
| 2005/0027423 A1 | 2/2005 | Minami et al. | |
| 2005/0209760 A1 | 9/2005 | Tabata et al. | |
| 2005/0234629 A1 | 10/2005 | Maruki | |
| 2006/0155453 A1 | 7/2006 | Han et al. | |
| 2008/0161158 A1 * | 7/2008 | Kojima et al. | 477/120 |
| 2009/0036267 A1 * | 2/2009 | Bellinger | 477/97 |
| 2009/0075774 A1 * | 3/2009 | Tabata et al. | 475/150 |
| 2010/0041512 A1 | 2/2010 | Silveri et al. | |
| 2010/0185370 A1 * | 7/2010 | Wurthner et al. | 701/61 |
| 2010/0305822 A1 * | 12/2010 | Kresse et al. | 701/56 |
| 2012/0072085 A1 * | 3/2012 | Wurthner et al. | 701/55 |
| 2012/0083980 A1 * | 4/2012 | Kresse et al. | 701/56 |
| 2012/0151906 A1 * | 6/2012 | Merrion et al. | 60/327 |
| 2013/0035829 A1 | 2/2013 | Tiberg | |
| 2013/0046526 A1 | 2/2013 | Yucel et al. | |
| 2013/0066528 A1 * | 3/2013 | Kresse et al. | 701/54 |
| 2013/0173124 A1 * | 7/2013 | Palmer | 701/55 |
| 2014/0188355 A1 * | 7/2014 | Kresse et al. | 701/54 |

* cited by examiner

SYSTEM FOR SELECTING A TRANSMISSION ECONOMY-BASED SHIFT SCHEDULE

RELATED APPLICATIONS

This application is a divisional application of U.S. application Ser. No. 13/242,477, filed Sep. 23, 2011, which claims priority to U.S. Provisional Patent Application Ser. No. 61/389,414, filed Oct. 4, 2010, which is hereby incorporated by reference in its entirety.

BACKGROUND

The present invention relates to a motor vehicle transmission having a plurality of automatically selectable gear ranges, and in particular, to a system of selecting an economy-based shift schedule for a transmission in a vehicle.

Conventional vehicle transmissions include software or a control scheme for determining when the automatic transmission shifts from one gear range (or ratio) to another gear range. This control scheme is commonly referred to as a "shift schedule" and is based on multiple factors, e.g., engine torque, vehicle speed, accelerator pedal position (i.e., throttle percentage), transmission output speed, and tractive effort. Any given shift schedule for a vehicle balances fuel economy against performance, and so a shift schedule may be categorized as an "economy shift schedule" or a "performance shift schedule" based on the balance that characterizes the shift schedule. For example, in an economy-biased shift schedule, a transmission operates in an economy shift schedule more often than it operates in a performance shift schedule.

Also, it is desirable to be able to change shift schedules during vehicle operation since there are times when better fuel economy is preferred over high-performance and vice-versa. For example, when the vehicle is heavily loaded or is ascending a steep grade, the transmission may detect such a condition and select a performance-based shift schedule. Alternatively, when the vehicle is able to quickly accelerate, e.g., when the vehicle is unloaded or descending a steep grade, the transmission may detect this condition and select an economy-based shift schedule.

In a conventional vehicle having an engine and automatic transmission, an engine control module (ECM) controls the engine and a transmission control module (TCM) controls the transmission. A wiring harness is provided that electrically connects the ECM to the TCM so that information related to the engine can be communicated to the TCM. Transmission software is downloaded to the TCM and includes multiple shift schedules that control when the transmission shifts from one gear ratio to another gear ratio. During vehicle operation, the TCM detects a driving condition or a change in a driving condition and selects a shift schedule accordingly.

For the transmission to detect the driving condition or the change in a driving condition, the TCM receives engine data from the ECM and possibly other information about the vehicle from other sources. As such, the transmission must be compatible with the engine and other outside sources to receive this information. For a transmission to operate effectively with the engine, transmission manufacturers must work closely with engine manufacturers to ensure that the TCM timely receives engine data from the ECM. As a result, transmissions can only be mounted behind engines from which the TCM is able to receive engine data.

If a transmission were mounted behind an engine with which it is not compatible, the ECM might not be able to communicate engine data (e.g., engine torque) to the TCM and the TCM might therefore be unable to select the appropriate shift schedule. Alternatively, even if the ECM were able to communicate engine data to the TCM, the ECM still might not be able to communicate the correct data or might provide the data to the TCM too slowly. As a result, as driving conditions change, the TCM would be unable to select a different shift schedule based on the changing driving condition because it would be waiting to receive engine data from the ECM. These problems undesirably limit the number of vehicles in which a given transmission can be installed and require costly and time-consuming coordination efforts between engine and transmission design teams.

In addition, some transmissions can only operate in an economy mode or performance mode based on the type of shift schedule being performed. As such, a transmission can be shifting between gear ranges according to shift points in a performance shift schedule and be unable to switch to an economy shift schedule under certain conditions. Alternatively, a transmission may be able to switch between shift schedules, but the vehicle productivity is negatively affected.

What is needed is an improved system of selecting a transmission economy-based shift schedule when fuel economy can be improved and vehicle performance will not be negatively affected. Further, it would be desirable to be able to select the economy-based shift schedule quickly and without regards to the shift schedule under which the transmission is performing at the time of making the selection.

SUMMARY OF THE INVENTION

The present invention provides a method of selecting an economy mode shift schedule for a transmission coupled to a motor vehicle. The transmission has a transmission control circuit and the vehicle has an engine control circuit. The method includes calculating vehicle acceleration and determining a change in accelerator pedal position. The net tractive effort force of the vehicle is determined for a current gear range of the transmission. Also, the net tractive effort force for the current gear range is compared to a maximum tractive effort force for a desired gear range. The method further includes selecting the economy mode shift schedule for the transmission based on the comparison and controlling shifting between one or more gear ranges of the transmission according to the economy mode shift schedule.

In addition, the comparing step can include comparing the vehicle acceleration to a threshold. If the vehicle acceleration exceeds the threshold, the selecting and controlling steps are not completed. Similarly, the comparing step can also include comparing the change in accelerator pedal position to a threshold. If the change in accelerator position exceeds the threshold, the selecting and controlling steps are not completed.

In one embodiment, if the net tractive effort force is less than the total of the maximum tractive effort force and a threshold, the selecting and controlling steps are completed. Further, if the net tractive effort force is less than the total of the maximum tractive effort force and the threshold, the transmission shifts from a lower gear range to a higher gear range. The method can further include determining if, after the transmission shifts from the lower gear range to the higher gear range, the transmission shifts from the higher gear range to the lower gear range within a period of time. As such, the threshold can be adjusted if the transmission shifts from the higher gear range to the lower gear range within the period of time.

In a different embodiment, the step of determining the net tractive effort force can include receiving engine torque data over a data link established between the transmission control circuit and the engine control circuit such that the engine torque data corresponds to engine speed and a maximum accelerator pedal position. This step can also include computing a ratio value of a rear axle and tire size of the vehicle, determining a state of a torque-generating mechanism of the transmission, determining gear ratios for the one or more gear ranges of the transmission, and computing the net tractive effort force of the vehicle as a function of the engine torque data, the ratio value of the rear axle and tire size of the vehicle, the state of the torque-generating mechanism, and the gear ratios of the transmission. Vehicle speed and transmission output speed can be determined such that the computed ratio value is a function thereof. Also, in the step of determining a state of a torque-generating mechanism, a determination is made whether a torque converter of the transmission is in a converter mode or lockup mode.

In another embodiment, a system is provided for selecting an economy mode shift schedule for a motor vehicle. The system includes a transmission having a torque converter and a plurality of selectable gear ranges and a transmission control circuit including a control module having the economy mode shift schedule stored therein. The transmission control circuit is configured to operably control the transmission. The system also includes an engine control circuit configured to control operation of an engine. The engine is operably coupled to the transmission. In addition, a communication link is configured to transfer information between the transmission control circuit and the engine control circuit. The control module further includes instructions stored therein for executably controlling the transmission control circuit to receive engine torque data from the communication link, calculate vehicle acceleration, determine an accelerator pedal position, determine a mode of the torque converter, compute a net tractive effort force of the vehicle, compare the vehicle acceleration to a first threshold, the accelerator pedal to a second threshold, and the net tractive effort force to a third threshold, select the economy mode shift schedule for the transmission based on the comparison, and control shifting between gear ranges of the transmission according to the economy mode shift schedule.

In one form of this embodiment, the instructions stored in the control module can include instructions that are executable by the transmission control circuit to determine the net tractive effort force as a function of the engine torque data, the gear ratio of a selected gear range, and the mode of the torque converter. In another form thereof, the instructions stored in the control module can include instructions executable by the transmission control circuit to compute a ratio value of a rear axle and tire size of the vehicle and determine gear ratios for the selectable gear ranges of the transmission.

In the system, the instructions stored in the control module can include instructions executable by the transmission control circuit for controlling a shift from a first gear range to a second gear range. The instructions stored in the control module can further include instructions executable by the transmission control circuit to determine if, after the transmission shifts from the first gear range to the second gear range, the transmission shifts from the second gear range to the first gear range within a period of time.

In an alternative embodiment of the system, the third threshold can include a maximum tractive effort force and a tractive effort threshold value. In addition, the instructions stored in the control module can further include instructions executable by the transmission control circuit for adjusting the tractive effort threshold value.

In a different embodiment, a method of operating a motor vehicle at an optimal vehicle speed without negatively affecting vehicle productivity is provided. The method includes determining gear ratios of all gear ranges of the transmission, receiving engine torque data as a function of engine speed for all gear ranges, and calculating vehicle acceleration and determining accelerator pedal position. In addition, a net tractive effort force of the vehicle is determined for a current gear range of the transmission. The method also includes comparing the vehicle acceleration to a first threshold, the accelerator pedal position to a second threshold, and the net tractive effort force to a third threshold. The method further includes selecting an economy mode shift schedule for the transmission based on the comparison and controlling shifting between one or more gear ranges of the transmission according to the economy mode shift schedule.

In one form of this embodiment, the controlling shifting can include determining if an upshift from a lower gear range to a higher gear range can be completed. The method can also determine if, after the upshift from a lower gear range to a higher gear range is completed, the transmission downshifts from the higher range to the lower range within a period of time. Further, the method can include adjusting the third threshold when the transmission downshifts from the higher range to the lower range within the period of time.

In another form of this embodiment, when the economy mode shift schedule includes at least a first gear range having a first gear ratio, a second gear range having a second gear ratio, and a third gear range having a third gear ratio, the second gear ratio being less than the first gear ratio and the third gear ratio being less than the second gear ratio, the controlling shifting can include shifting from the first gear range to the second gear range. In this embodiment, after shifting from the first gear range to the second gear range, the method is repeated. Also, the method can include shifting from the second gear range to the third gear range. Alternatively, the method can include shifting from the first gear range to the third gear range.

In an alternative embodiment, a method is provided for selecting an economy mode shift schedule for a transmission having X selectable gear ranges and coupled to a powered vehicle. The transmission has a transmission control circuit and the vehicle has an engine control circuit for controlling an engine. The method includes calculating vehicle acceleration and a change in accelerator pedal position; computing a net tractive effort force of the vehicle for a current gear range N of the transmission, where N<X; determining a maximum tractive effort force for all upshift gear ranges, the upshift gear ranges comprising gear ranges N+1, N+2, . . . , and N+J, where J=X−N; comparing the net tractive effort force to each maximum tractive effort force; and selecting the economy mode shift schedule for the transmission based on the comparison.

In one aspect of this embodiment, the method includes controlling shifting between gear range N and one of the upshift gear ranges. In another aspect, the method can include (a) determining which of the upshift gear ranges has a maximum tractive effort force greater than the net tractive effort force; (b) for those upshift gear ranges satisfying the condition of step (a), calculating the difference between the maximum tractive effort force of those upshift gear ranges and the net tractive effort force; and (c) identifying the upshift gear range corresponding to the smallest difference calculated in step (b). The controlling step may comprise shifting from gear range N to the upshift gear range identified in step (c).

In addition, the method can include determining if, after the shift from gear range N to the upshift gear range, the transmission downshifts from the upshift gear range to gear range N within a period of time. The maximum tractive effort force associated with the upshift gear range can be adjusted when the transmission downshifts from the upshift gear range to gear range N within the period of time. The controlling step of the method can include shifting from gear range N to upshift gear range L, where L is between N and M, and upshift gear range M corresponds to the upshift gear range identified in step (c). Further, the method can include adding a constant threshold value to each maximum tractive effort force.

An advantage of shifting to the economy shift schedule, as described in the present disclosure, is improving the fuel efficiency of the vehicle carrying the transmission. The economy shift schedule can be selected regardless of the type of shift schedule the transmission previously was operating in. As such, the economy shift schedule can be selected even when the vehicle operates according to a performance-based shift schedule.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
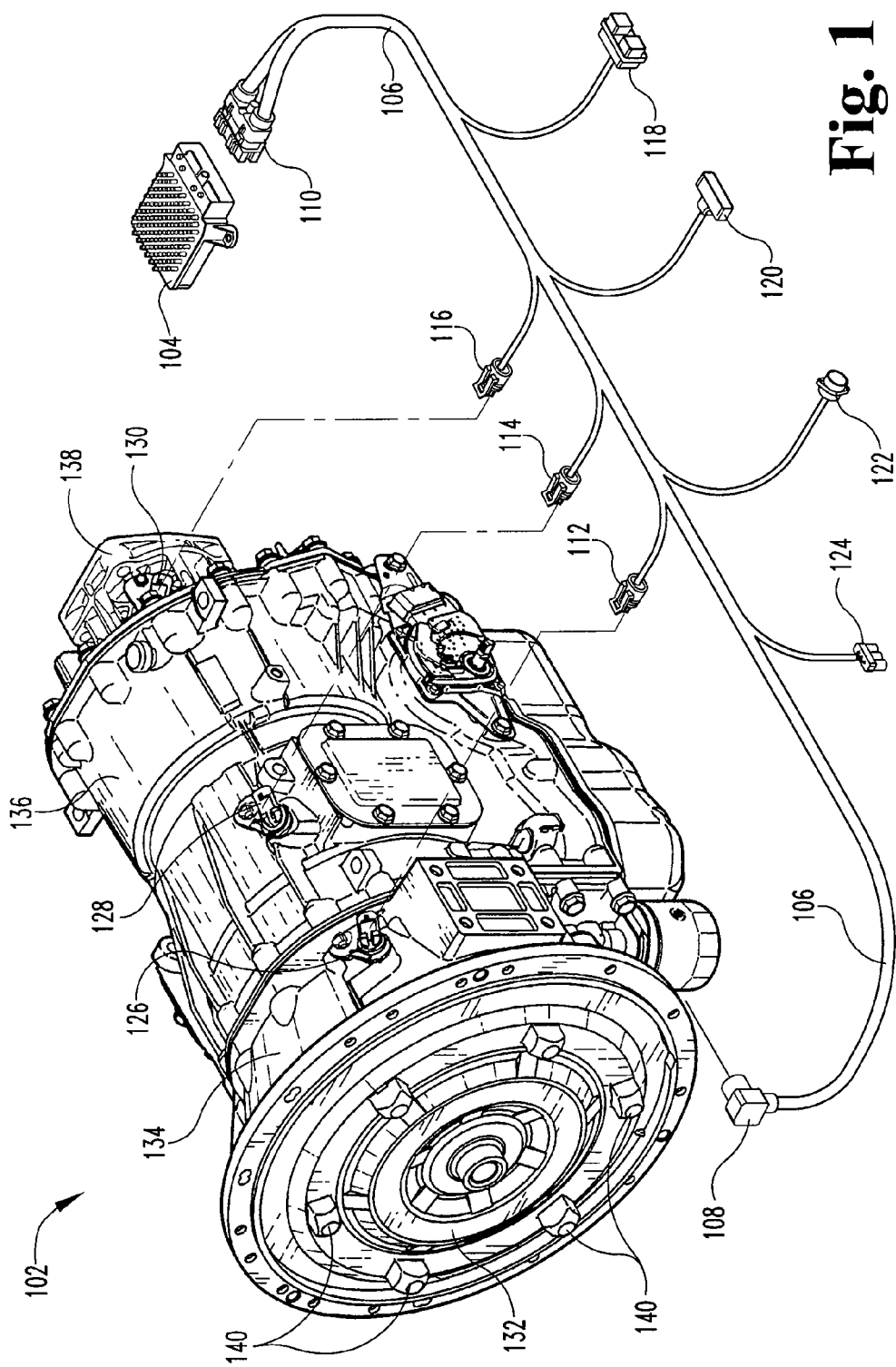
FIG. 1 is a perspective view of one embodiment of a transmission coupled to a controller via a wiring harness.

The present invention relates to an economy-based, transmission shift schedule which controls the operation of a transmission in a vehicle. With reference to FIG. 1, an exemplary embodiment of a transmission setup is provided. A transmission 102 is shown in FIG. 1 with a controller 104, i.e., transmission control module ("TCM"). Software is downloaded to the TCM 104 and a wiring harness 106 couples the TCM 104 to the transmission 102. A conventional wiring harness 106 includes an outer plastic body that surrounds wires that extend from a TCM connector 110 at one end of the wiring harness 106 to a transmission connector 108 disposed at the opposite end of the wiring harness 106.

The wiring harness 106 can also include other connectors such as speed sensor connectors. In FIG. 1, for example, an engine or input speed sensor connector 112 couples to an engine or input speed sensor 126 of the transmission 102. Likewise, a turbine speed sensor connector 114 couples the wiring harness 106 to a turbine speed sensor 128 of the transmission 102. Also, an output speed sensor connector 116 of the wiring harness 106 couples to an output speed sensor 130 of the transmission 102. Other possible connectors of the wiring harness 106 include a throttle input source connector 120, a throttle position sensor (TPS) connector 124, a vehicle connector 118 (e.g., Vehicle Interface Module ("VIM") connector), and an alternative transmission harness mating connector 122. There can be additional connectors and/or harnesses in other embodiments.

As noted, the transmission 102 can include the engine or input speed sensor 126, turbine speed sensor 128, and output speed sensor 130. The transmission 102 mounts to an engine (not shown) by coupling a converter housing 134 of the transmission 102 to a bell housing (not shown) of the engine (not shown). A torque-transferring mechanism 132, e.g., a torque converter, of the transmission 102 can include a plurality of lugs 140 that couple to a flex plate (not shown) via flex plate bolts (not shown). For purposes of this embodiment, the torque-transferring mechanism 132 will be referred to as a torque converter.

In one embodiment, an internal combustion engine (not shown) can be coupled to the transmission 102 via the torque converter 132. The internal combustion engine can be configured to rotatably drive an output shaft (not shown) of the engine that is coupled to an input or pump shaft (not shown) of the torque converter 132. The torque converter 132 can further include a turbine (not shown) that is coupled via splines to a turbine shaft (not shown) of the transmission 102. In turn, the turbine shaft (not shown) can be coupled to, or integral with, a rotatable input shaft (not shown) of the transmission 102. An output shaft (not shown) of the transmission 102 can be coupled to or integral with, and rotatably drives, a propeller shaft (not shown) that is coupled to a conventional universal joint (not shown). The universal joint (not shown) can be coupled to, and rotatably drives, a drive axle (not shown) having tires or wheels mounted thereto at each end. The output shaft (not shown) of the transmission 102 drives the tires in a conventional manner via the propeller shaft, universal joint and drive axle.

In the torque converter 132, a conventional lockup clutch (not shown) can be connected between the pump (not shown) and turbine (not shown) of the torque converter 132. The operation of the torque converter 132 is conventional such that it can operate in a so-called "converter" mode or "lockup" mode. The torque converter 132 can operate in "converter" mode during certain operating conditions such as vehicle launch, low speed and certain gear shifting conditions. In "converter" mode, the lockup clutch (not shown) is disengaged and the pump (not shown) rotates at the rotational speed of the engine output shaft (not shown) while the turbine (not shown) is rotatably actuated by the pump (not shown) through a fluid (not shown) interposed between the pump (not shown) and the turbine (not shown). In this operational mode, torque multiplication occurs through the fluid coupling such that the turbine shaft (not shown) is exposed to more drive torque than is being supplied by the engine (not shown), as is known in the art.

The torque converter 132 can operate in "lockup" mode during other operating conditions. In the "lockup" mode, the lockup clutch (not shown) is engaged and the pump (not shown) is thereby coupled directly to the turbine (not shown) so that the engine output shaft (not shown) is directly coupled to the input shaft (not shown) of the transmission 102, as is also known in the art.

During operation, as the engine rotatably drives the torque converter 132, the engine or input speed sensor 126 detects the rotational speed of the torque converter 132. The torque converter 132 can include ribs or protrusions (not shown) that protrude from the surface of the torque converter 132 and which the engine or input speed sensor 126 measures during each revolution.

As shown in FIG. 1, the transmission 102 can also include a main case or housing 136 that encloses a gearbox, i.e., clutch plates and reaction plates, a number of automatically selectable gears, planetary gear sets, hubs, pistons, shafts, and other housings. As previously described, the transmission 102 can further include a turbine shaft (not shown) which can rotate various clutches in the transmission. A gear or tonewheel (not shown) can be coupled to the turbine shaft (not shown) such that the turbine speed sensor 128, which couples to the main case or housing 136, measures the rotational speed of the gear or tonewheel (not shown). Other transmissions can include alternative ways known to the skilled artisan for measuring turbine speed.

In one embodiment, the transmission 102 can include an output shaft (not shown) which is enclosed by a rear cover 138 of the transmission 102. To measure the output speed of the transmission 102, the output speed sensor 130 can couple to the rear cover 138. A smaller gear or tonewheel (not shown) can be coupled to the output shaft (not shown) such that the output shaft and gear or tonewheel rotate together. The output speed sensor 130 is aligned with the gear or tonewheel and measures the rotational speed of the output shaft. Thus, over a given period of time, the output speed of the transmission is measured.

Transmission shift schedules and other related instructions are included in software which is downloaded to the TCM 104. The TCM 104 can control the shifting of the transmission by electrically transferring instructions to the transmission such that certain actions are carried out by the clutches, pistons, etc. In one non-limiting embodiment, the TCM 104 is part of a transmission control circuit that can further include an electronic solenoid and valve assembly for controlling the engaging and disengaging of clutch assemblies, etc. Components within the transmission 102 can be activated electrically, mechanically, pneumatically, semi-automatically, and/or manually. The transmission control circuit is able to control the operation of the transmission to achieve desired performance.

Based on instructions in a transmission software program, the transmission control circuit (e.g., TCM 104) can select a shift schedule depending on a vehicle's driving condition and execute instructions contained in the software by sending signals through the wiring harness 106 to control the transmission 102. The TCM 104 can also receive measurement data from the transmission 102 such as, for example, input speed from the input speed sensor 126, turbine speed from the turbine speed sensor 128, and output speed from the output speed sensor 130. In an embodiment in which the transmission does not include a torque converter 132, the transmission may only have an input speed sensor 126 and output speed sensor 130. The TCM 104 can also calculate various parameters including transmission gear ratio or range, which is typically the ratio of input speed to output speed. In an embodiment in which the transmission 102 has a torque converter 132, the transmission gear ratio or range can also be determined by the ratio of turbine speed to output speed.

The TCM 104 can also receive accelerator pedal position (i.e., throttle percentage) from a throttle input source, which can be coupled to an engine control module (ECM) for transmitting throttle data over a data link. Examples of a conventional data link include J1587 data link, J1939 data link, IESCAN data link, GMLAN, Mercedes PT-CAN, Hardwire TPS (throttle position sensor) to TCM, and Hardwire PWM (pulse width modulation) to TCM. Information such as accelerator pedal position that is communicated over the data link is not limited to a particular engine/transmission configuration. Instead, the data link can be adapted to most vehicle setups.

For background purposes, an economy shift schedule can be selected for improving the fuel efficiency of a vehicle. The transmission control circuit can select the economy shift schedule based on engine and transmission data. In many setups, the transmission control circuit can operate according to a downloadable software program or logic which selects between an economy shift schedule and a performance shift schedule. The economy shift schedule may be selected, for example, when the transmission control circuit detects the vehicle is unloaded or is able to accelerate quickly. To execute the economy shift schedule, for example, the TCM may command a shift from a higher gear ratio to a lower gear ratio at a lower output speed than if the TCM was commanding the same shift based on the performance shift schedule. On the other hand, if the TCM detects the vehicle is unable to accelerate quickly and/or predicts the vehicle is loaded or ascending a steep grade, the TCM selects the performance shift schedule. To implement a performance shift schedule, for example, the TCM may command a shift from a lower gear ratio to a higher gear ratio at a higher output speed than if the TCM were commanding the same shift based on the economy shift schedule. At a higher gear ratio, the transmission produces greater torque, for example, to move a loaded vehicle or assist a vehicle as it ascends a steep grade.

In the present disclosure, aspects of a method of selecting an enhanced economy shift schedule are provided. Unlike many conventional economy shift schedules, however, at least one exemplary embodiment of the method of the present disclosure can be enabled when a vehicle is operating according to either a performance shift schedule or economy shift schedule. In other words, the aspects of the present disclosure provide an enhanced, or improved, economy shift schedule which can be selected to provide additional fuel savings to the vehicle. A vehicle operating according to a conventional economy shift schedule can obtain further fuel-saving benefits when predetermined conditions are met for enabling the enhanced or improved economy shift schedule. Alternatively, even if a vehicle is operating according to a performance shift schedule, the enhanced economy shift schedule can be selected and the transmission shifting controlled accordingly to achieve improved fuel efficiency. The ability to improve fuel efficiency by selecting the enhanced economy shift schedule when a transmission is operating according to a conventional performance shift schedule is one of many advantages of the present disclosure.

In an exemplary aspect, the transmission control circuit can operate according to logic for selecting either an economy or performance shift schedule. Regardless of whether the transmission control circuit selects the economy shift schedule or performance shift schedule, further logic enables the transmission control circuit to decide whether to enable a third shift schedule, i.e., the enhanced economy shift schedule as described in the present disclosure. In this aspect, the third shift schedule (e.g., enhanced economy shift schedule) can only be enabled after the transmission control circuit selects either the economy shift schedule or performance shift schedule. As previously described, the enhanced economy shift schedule enables a vehicle to achieve better fuel efficiency than either the economy or performance shift schedule. In alternative aspects, however, it may be desirable to select the enhanced shift schedule without previously selecting the economy or performance shift schedule.

In a related aspect of the present disclosure, before the enhanced economy shift schedule can be selected, several determinations are made by the transmission control circuit. Since another advantage of the enhanced economy shift schedule is its implementation into most vehicle setups (e.g., engine/transmission combinations), the transmission control circuit learns the engine torque curve at a maximum accelerator pedal position. This learning can take place at various times, but generally takes place when the engine and transmission first begin communicating with one another (i.e., the first time the engine/transmission combination operates at the maximum accelerator pedal position). This can vary for different embodiments, and may even occur automatically in real-time.

Figure 2:
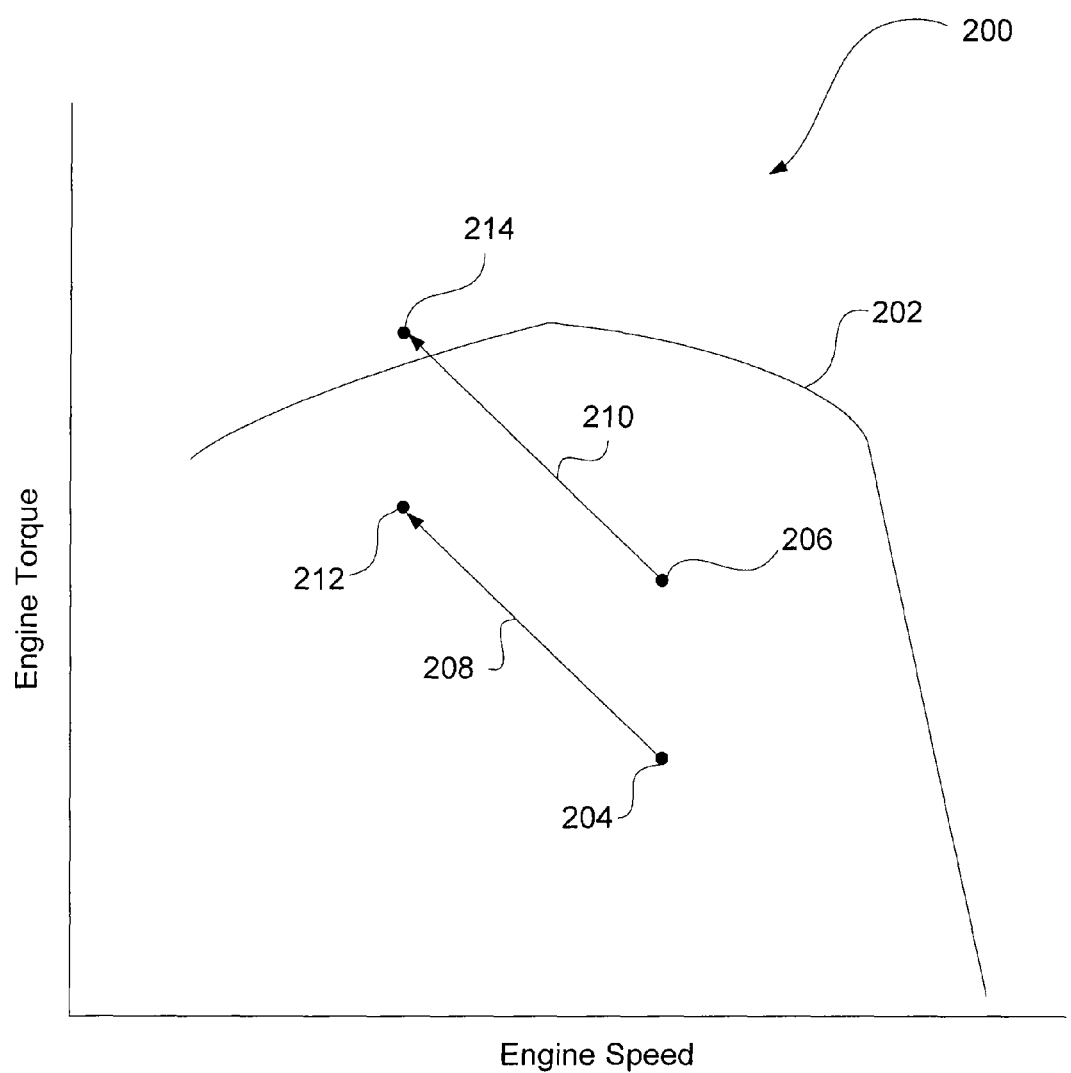
FIG. 2 is a diagram of an exemplary torque curve with shift points for an economy shift schedule.

Referring to FIG. 2, an exemplary diagram 200 of an engine torque curve 202 is shown as a function of engine speed at a maximum accelerator pedal position. To learn the engine torque curve, engine torque data can be communicated to the transmission control circuit (e.g., TCM 104) via a data link. In this embodiment, the engine torque data is communicated over the data link when the transmission control circuit is first able to communicate with a control circuit of the engine. The engine control circuit, for example, can have an engine control module that communicates to the TCM 104.

Also shown in FIG. 2 are two shift points 204, 206. To enable or select the enhanced economy shift schedule, the transmission control circuit determines the current range of the transmission and its corresponding gear ratio. The transmission control circuit also determines, if the transmission shifts from a lower gear range to a higher gear range, the impact of engine torque on such a shift. In other words, among many different factors, the transmission control circuit determines whether the transmission can complete a shift to a higher gear range without exceeding the maximum engine torque in the next range. For purposes of this disclosure, the lower gear range has a higher gear ratio than the higher gear range. In a lower gear range, more output torque is transferred to the rear axle and tires of the vehicle and thus can be preferable in a performance mode. In a higher gear range, however, there can be less output torque transferred to the rear axle and tires of the vehicle. Better fuel efficiency can be achieved when a transmission operates in a higher gear range.

According to the diagram 200 of FIG. 2, if the transmission is operating at shift point 204, the transmission control circuit can determine if shifting to a higher gear range is obtainable. As shown, arrow 208 indicates that a shift from shift point 204 to a higher gear range (e.g., shift point 212) can be achieved without exceeding the engine torque limit of the engine torque curve 202. On the other hand, if the transmission is operating at shift point 206, the transmission control circuit can determine that shifting to a higher gear range (e.g., shift point 214) is not obtainable. Instead, as shown, arrow 210 indicates that a shift to the higher gear range cannot be achieved without exceeding the engine torque limit of the engine torque curve 202. If the transmission attempts to shift to the higher gear range from shift point 206, the engine will not allow the shift to be completed and vehicle speed will be reduced. As vehicle speed decreases, the transmission control module will likely downshift to a lower gear range.

One reason the shift cannot be made from shift point 206 to shift point 214 is due to a lack of tractive effort force. Although the shift points are shown in FIG. 2 relative to engine torque, in at least one embodiment the transmission control circuit determines the current tractive effort force before enabling or selecting the enhanced economy shift schedule. Tractive effort force is the net force acting on the tire patches of the drive wheels which propels the vehicle into motion. During operation, the current tractive effort force can be determined as a function of maximum engine torque, transmission torque ratio, and rear axle ratio. This will be described in further detail below.

The enhanced economy shift schedule is unlike conventional or nominal shift schedules because it generally operates the engine at a lower engine speed to reduce the amount of fuel being consumed by the vehicle. Since the enhanced economy shift schedule can be selected when the transmission is operating according to either a conventional economy shift schedule or performance shift schedule, it is desirable to select the enhanced shift schedule when there will be substantially no impact on vehicle productivity. Vehicle productivity, or performance, can refer to average vehicle speed. In other words, the enhanced economy shift schedule can be enabled so long as the average vehicle speed does not significantly change. As described above with reference to FIG. 2, if the transmission attempts to shift too soon, i.e., such that there is a lack of tractive effort force at the wheels, the transmission may undergo shift cycling. Shift cycling occurs when the transmission shifts from a first gear range to a second gear range and then shifts back to the first gear range within a relatively short period time. When shift cycling occurs, vehicle speed changes because the shift from the first gear range to the second gear range cannot be maintained or held. Thus, two related factors that affect the selection of the enhanced shift schedule are vehicle productivity and shift cycling.

Note, however, that the weight of the vehicle is not relevant to whether the transmission control circuit selects the enhanced economy shift schedule. Therefore, even if the vehicle is pulling a trailer or other load, for example, and operating according to a performance shift schedule, the enhanced economy shift schedule can still be selected so long as vehicle productivity is maintained and the transmission does not undergo subsequent shift cycling.

In addition, it is desirable to enable the enhanced economy shift schedule as soon as all criteria for doing so are satisfied. As described above, the enhanced economy shift schedule can also be enabled for most vehicle setups and therefore it is less dependent on engine model, throttle progression, vehicle model, etc.

Figure 3:
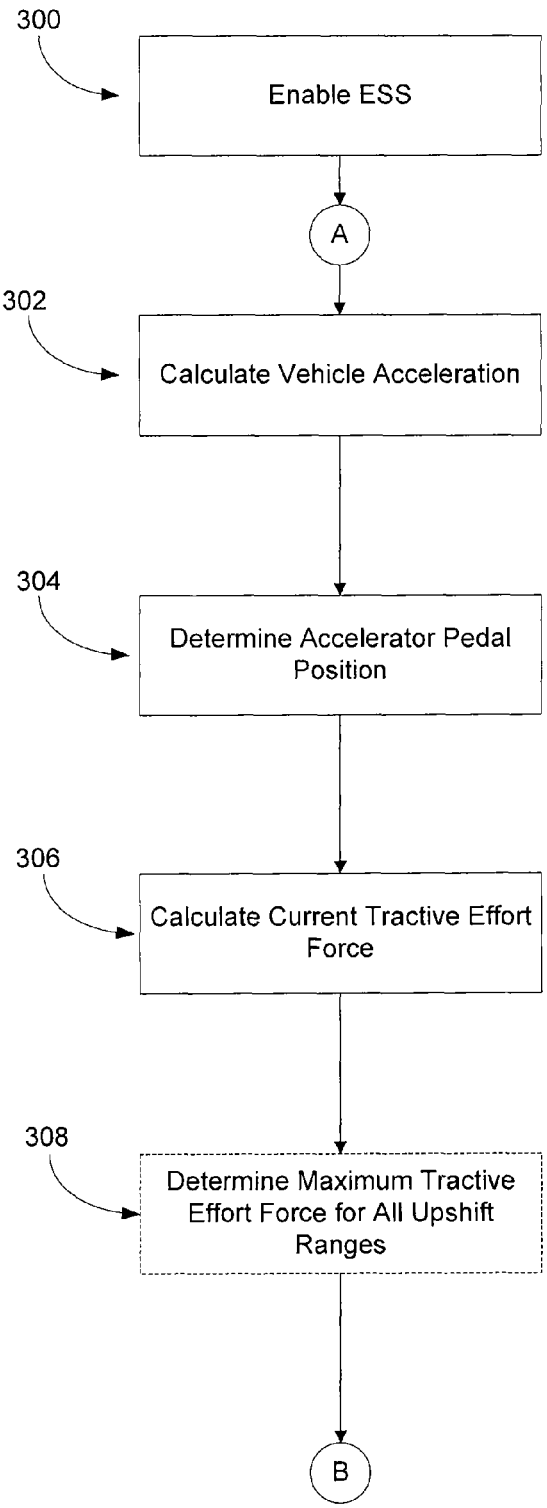
FIG. 3 is a flow chart of an embodiment for selecting an economy shift schedule.

Referring to FIG. 3, an exemplary embodiment of a method 300 for selecting an enhanced economy shift schedule (ESS) is shown. The method 300 includes several steps before enabling or selecting the shift schedule. In other embodiments, there can be more steps required for enabling or selecting the enhanced economy shift schedule. For instance, in step 302, the transmission control circuit calculates vehicle acceleration. There are several ways vehicle acceleration can be determined. First, as shown in FIG. 1, the transmission can include an output speed sensor 130 for measuring output speed of the transmission. Vehicle speed information can be communicated to the transmission control circuit via the data link. Once the transmission output speed and vehicle speed are known, the ratio of the two can be used to calculate the output acceleration of the transmission (e.g., output speed/ vehicle speed). Once the output acceleration of the transmission is known, vehicle acceleration can be calculated based on a ratio of the rear axle and tire size. This ratio takes into account losses from the transmission output shaft to the tire patch.

Vehicle acceleration can also be obtained by taking the derivative of vehicle speed. As described above, vehicle speed information is communicated over the data link to the transmission control circuit. At times, this data signal can be slow and therefore the vehicle speed information may not be entirely accurate or the most up-to-date information. As such, if vehicle speed information is slowly communicated to the transmission control circuit, this can be a less preferable means for computing vehicle acceleration.

In step 304, the transmission control circuit determines the position of the accelerator pedal in the vehicle. This information can be communicated to the transmission control circuit via the data link. Accelerator pedal position can have different units, but in one embodiment, the position is defined as throttle percentage (e.g., maximum accelerator pedal position equates to 100% throttle and minimum accelerator pedal position equates to 0% throttle).

In method 300, the current tractive effort force is calculated in step 306. As described above, tractive effort force is a function of engine torque, gear ratio, and torque converter torque ratio. The following is a brief description of how each variable used for calculating tractive effort force can be obtained.

The current engine torque can be determined several ways. First, the torque can be communicated to the transmission control circuit via the data link. Alternatively, a sensor can be positioned between the engine and transmission for reading engine torque. For example, the sensor could be positioned on a flywheel or shaft of the engine. As such, the sensor can be electrically coupled to the transmission control circuit to communicate the measured engine torque thereto.

The gear ratio, as described above, is the ratio of input speed to output speed. In addition, gear ratio is also the ratio of turbine speed to output speed. The input speed, or engine speed, can be measured by the input speed sensor 126 as shown in FIG. 1. Similarly, turbine speed and output speed can be measured by the turbine speed sensor 128 and output speed sensor 130, respectively.

The torque converter torque ratio is a function of the torque converter model and the mode in which the torque converter is operating at the time of determination. The torque converter model produces a torque converter torque ratio, which can be multiplied by the gear ratio to produce the transmission torque ratio. Above a specified gear range, the torque converter may be operating in "lockup" mode such that the transmission torque ratio is unity and is otherwise generally a conventional function of vehicle speed or a predetermined torque ratio value. In some embodiments, the transmission torque ratio can also include an inefficiency factor that models efficiency losses through the gear system and the torque converter of the transmission. In such embodiments, such gear system/torque converter inefficiencies can be modelled as a function of gear range and engine speed to produce an inefficiency factor which can be added to, subtracted from or multiplied by the torque ratio, such that the overall torque ratio is generally reduced by the inefficiency factor. Alternatively or additionally, the gear system/torque converter inefficiencies can be produced in the form of a torque reduction factor that gets subtracted from the tractive force.

The transmission control circuit also can calculate or determine the rear axle ratio and tire size of the vehicle. The rear axle ratio is a ratio of the number of revolutions of the propeller shaft (not shown in FIG. 1) required to turn the rear drive axle (not shown) one complete revolution, and the tire size is the diameter of the tires coupled to the vehicle. In some embodiments, the rear axle ratio and the tire size can be pre-programmed into the transmission control circuit, and accordingly these parameters are retrieved from the transmission control circuit in step 306.

An advantage of the enhanced economy shift schedule over many conventional shift schedules is the lack of necessity for determining rolling resistance and aerodynamic forces acting against the vehicle. As a result, the transmission control circuit has fewer calculations and determinations to make before deciding whether to select the enhanced economy shift schedule.

Once the variables (e.g., engine torque, gear ratio, torque converter torque ratio, and rear axle ratio) are calculated, determined, or received by the transmission control circuit, the current tractive effort force can be computed in step 306. To do so, the current tractive effort force, CTEF, is calculated according to the following formula: CTEF=CET*GR*TCTR*RAR, where CET is current engine torque, GR is gear ratio, TCTR is torque converter torque ratio, and RAR is rear axle ratio. As shown in FIG. 3, once steps 302, 304, and 306 are completed, the method 300 proceeds to B (see FIG. 4).

Figure 4:
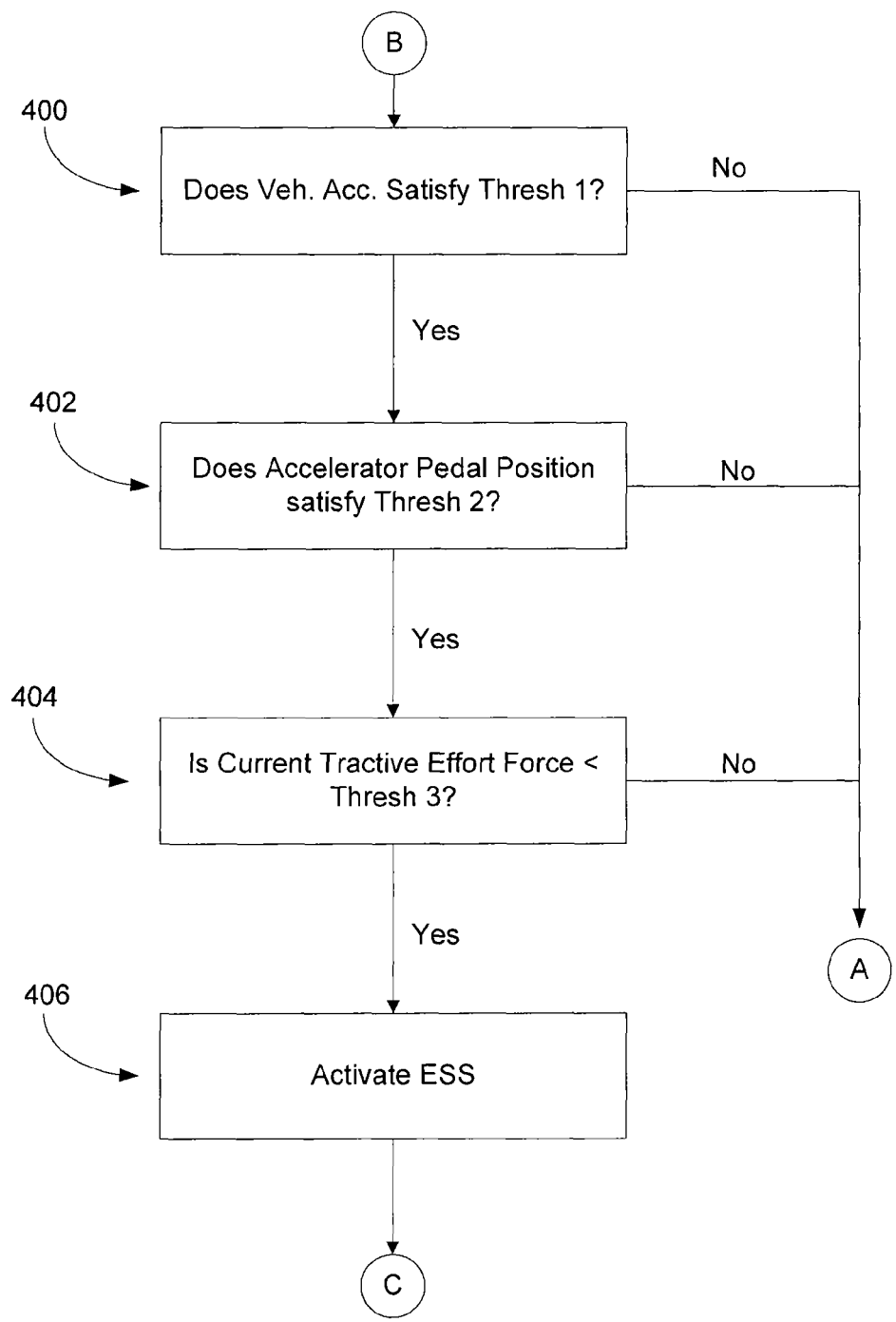
FIG. 4 is a flow chart of the embodiment of FIG. 3.

In FIG. 4, once calculations and values are made and/or received for vehicle acceleration, accelerator pedal position, and current tractive effort force, the method 300 for selecting the enhanced economy shift schedule goes through a number of algorithmic or conditional steps. For instance, in step 400, the transmission control circuit compares the current vehicle acceleration to a first threshold or algorithm, Thresh 1. Thresh 1 is generally defined as a constant value or range of values in the enhanced economy shift schedule. The value or range of values for Thresh 1 generally includes low acceleration values, because it is desirable to enable the shift schedule only when vehicle productivity will not be impacted. By setting Thresh 1 as a low acceleration value or range of values, it is presumed that vehicle productivity is less impacted when vehicle acceleration is low. In other words, if the vehicle acceleration is relatively low, there is an opportunity to shift to a higher gear range and get better fuel mileage without disregarding the vehicle operator's intent and negatively impacting vehicle productivity. In a non-limiting example, Thresh 1 may be equal to or less than about 0.5 m/s$^2$.

In step 402, the transmission control circuit compares the current accelerator pedal position to another threshold value or range, Thresh 2. More particularly, in this step, the transmission control circuit is determining if there is a change in accelerator pedal position, and if so, is the change significant enough to not enable or select the enhanced economy shift schedule. Once again, the intent of the vehicle operator is important. It is presumed that if there is a rapid change in accelerator pedal position, e.g., from 40% to 90% throttle, the vehicle operator desires more vehicle speed or output torque (e.g., when ascending a steep grade). In this case, vehicle productivity is negatively affected if the transmission control circuit enables the enhanced economy shift schedule, and thus the shift schedule cannot be enabled. On the other hand, if the change in accelerator pedal position satisfies the condition of step 402, the transmission control circuit will further evaluate the conditions of steps 400 and 404 before enabling the enhanced economy shift schedule. In another non-limiting example, the condition in step 402 may be satisfied if the change in accelerator pedal position is less than or equal to about 20% per second.

In step 404, the transmission control circuit evaluates the current tractive effort force to a third threshold value, Thresh 3. In this embodiment, Thresh 3 can have two components. The first component is a maximum tractive effort force for a higher gear range and the second component is a predetermined constant value or threshold margin value. In this step, the enhanced economy shift schedule can be selected if the current tractive effort force is less than Thresh 3.

As described above, the transmission 102 can have a number, X, of automatically selectable gear ranges. Thus, when the transmission is operating in gear range N, the transmission control circuit determines the maximum tractive effort force for gear range N+1. In other words, the transmission control circuit obtains information about the maximum tractive effort force for the next upshift gear range. To do so, the transmission control circuit receives engine torque data at a full accelerator pedal position over the data link. As shown in FIG. 2, the engine torque data is a function of engine speed, which can be measured, for example, by the engine or input speed sensor 126 (FIG. 1). The engine torque data can be organized to form an engine torque curve 202 (FIG. 2).

As an example, the transmission may be currently operating in gear range N with shift point 204 (FIG. 2). To enable the enhanced shift schedule, the next higher range gear, N+1, may have a shift point 212. At shift point 212, the transmission control circuit can obtain the maximum engine torque via the torque curve 202. The transmission control circuit can also determine a maximum tractive effort force at shift point 212 as a function of the maximum engine torque at gear range N+1 (i.e., shift point 212), the gear ratio for gear range N+1, the torque converter torque ratio for gear range N+1, and the rear axle ratio for gear range N+1. Once the maximum tractive effort force for gear range N+1 is known, the comparison in step 404 can be completed.

The second component of Thresh 3 is a predetermined constant value or threshold margin. As a non-limiting example, the maximum tractive effort force for gear range N+1 may be determined to be 12,000 Newton. The enhanced economy shift schedule can set the second component of Thresh 3 to be any predetermined value, but for purposes of this example, the threshold margin may be 1,000 Newton. Thus, the value of Thresh 3 is the total of the maximum tractive effort force for gear range N+1 and the threshold margin, i.e., 13,000 Newton. In step 404, if the current tractive effort force is less than 13,000 Newton, then the condition set forth in step 404 is satisfied.

If, however, the current tractive effort force is greater than 13,000 Newton, the shift from gear range N to gear range N+1 cannot be completed because there is not enough force at the tires. Although engine torque is shown in FIG. 2, if the transmission is operating in gear N at shift point 206, an upshift to gear range N+1 (e.g., shift point 214) cannot be achieved without exceeding the maximum engine torque. Similarly, the same shift cannot be completed if the current tractive effort force exceeds the total of the maximum tractive effort force and threshold margin.

In alternative embodiment, the transmission control circuit can select the enhanced economy shift schedule and shift the transmission from gear range N to gear range N+2, where gear range N+1 is skipped or not selected. The same conditions in steps 400, 402, and 404 are evaluated by the transmission control circuit, and if the conditions are satisfied, the shift from gear range N to gear range N+2 can be achieved. In this embodiment, the value of Thresh 3 in step 404 includes the total of the maximum tractive effort force for gear range N+2 and the threshold margin. In another alternative embodiment, it can be possible to shift from gear range N to gear range N+3, N+4, . . . N+j, where the transmission has X automatically selectable gear ranges and j is equivalent to X−N, so long as the current tractive effort force is less than the total of the maximum tractive effort force for gear range N+j and the threshold margin.

In one aspect of this alternative embodiment, step 308 can be an optional step. In other words, step 308 can either be included in method 300 if skip shifts are desirable, or method 300 can be configured such that step 308 is not an active step. In one aspect, step 308 can be enabled or disabled by a user.

In a different aspect, step 308 may not be included in method 300 (and thus skip shifts according to method 300 are not possible). In step 308, the transmission control circuit can determine the maximum tractive effort force for each selectable upshift gear range (e.g., N+1, N+2, . . . , N+J, where J=X−N). Thus, for those transmissions which may have tight gear steps, the transmission control circuit can determine if the transmission can shift from gear range N to an upshift gear range on the basis of the maximum tractive effort force for each upshift gear range. If one or more upshift gear ranges can be skipped, the transmission control circuit can control the shift from gear range N to gear range N+M, where M is an integer between 1 and J.

As a non-limiting example, a 10-speed transmission can have 10 forward ranges (i.e., X=10). Method 300 can proceed through steps 302, 304, and 306 as previously described. If step 308 is performed, the transmission control circuit can determine the maximum tractive effort force for each upshift gear range between gear range N+1 and N+J. Suppose the transmission is operating in a second range (i.e., N=2 and J=8), the possible upshift ranges therefore would be ranges 3-10. If step 308 is not performed, then the transmission control circuit would be comparing the current tractive effort force in second range (N=2) to the maximum tractive effort force in third range (i.e., N+1). If, however, step 308 is performed, the transmission control circuit can determine the maximum tractive effort force for third range (N+1), fourth range (N+2), fifth range (N+3), . . . , and tenth range (N+J). After this determination, the transmission control circuit proceeds to performing steps 400 and 402. Assuming those conditions are met, the transmission control circuit can then perform step 404.

In step 404, the threshold value, Thresh 3, can comprise a set of one or more values depending on the number of selectable upshift gear ranges. In the event step 308 is performed, Thresh 3 can include maximum tractive effort force values for all upshift gear ranges plus an added constant value (e.g., a threshold or margin). In this embodiment, the transmission control circuit performs a plurality of comparison determinations in step 404. For example, the current tractive effort force can be compared to the maximum tractive effort force for each upshift gear range, and whichever highest upshift range has a maximum tractive effort force that is greater than the current tractive effort force is the gear range to which the transmission control circuit will shift to in step 500. In the previous example, if the transmission is in second range, and the transmission control circuit determines that the current tractive effort force in second range is less than the maximum tractive effort force in third range and fourth range, but not fifth range and above, the transmission control circuit can then upshift to fourth range and skip third range.

Alternatively, method 300 can be defined such only a limited number of gear ranges can be skipped. This can be predetermined before method 300 is loaded into the transmission control circuit, or a user may have the capability to set the number of allowable skip shifts. In either case, the transmission control circuit may determine that a higher gear range is obtainable (e.g., the net tractive effort force is less than the maximum tractive effort force for that higher gear range), but method 300 may limit the transmission control circuit from shifting to the higher gear range because doing so would exceed the limit set for the number of gear ranges that can be skipped. Since method 300, however, is continuously performed, the transmission may shift from second range to fourth range in a first iteration and then shift from fourth range to sixth range in a second iteration, assuming the conditions set forth in method 300 are continuously met. This, of course, assumes too that method 300 limits the controlled shifting to only skip one gear range (e.g., second gear range to fourth gear range, skipping third gear range).

As shown in FIG. 4, if any one of the conditions set forth in steps 400, 402, or 404 cannot be satisfied, the enhanced economy shift schedule is not enabled or selected and method 300 repeats steps 302, 304, and 306. However, once the conditions set forth in steps 400, 402, and 404 are satisfied, the enhanced economy shift schedule can be enabled or selected in step 406. At least in this embodiment, this completes the conditional limitations for enabling or selecting the enhanced economy shift schedule. Once the shift schedule has been selected, method 300 proceeds to step 500.

Figure 5:
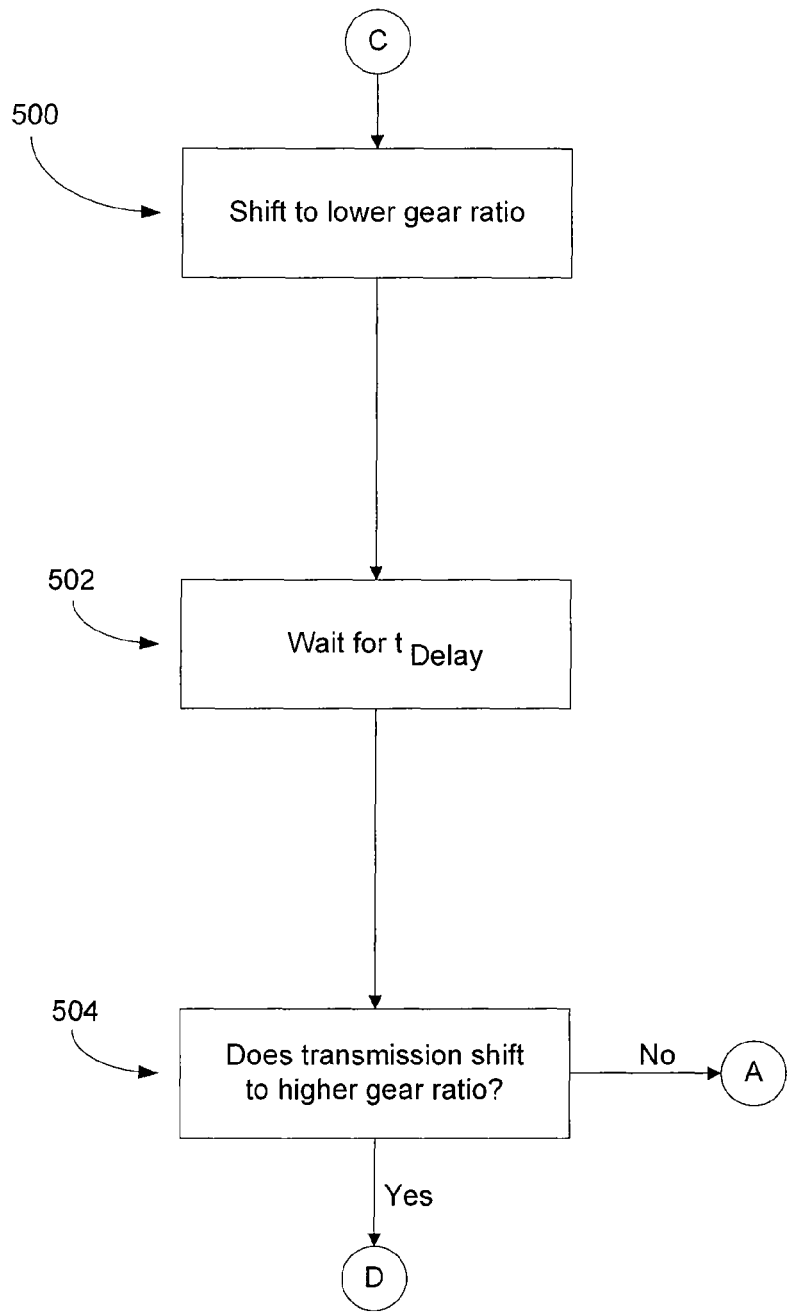
FIG. 5 is a flow chart of the embodiment of FIG. 3.

Referring to the embodiment of FIG. 5, once the enhanced economy shift schedule is enabled or selected, the transmission control circuit can control transmission shifting to achieve better vehicle fuel economy. To do so, in step 500, the transmission control circuit can shift to a higher gear range having a lower gear ratio. Once the shift to the higher gear range is complete, the transmission control circuit can activate a waiting period, $t_{Delay}$, in step 502. Alternatively, step 502 can be optional in some embodiments.

In step 504, the transmission control circuit determines if the transmission undergoes shift cycling after the enhanced economy shift schedule is selected. Again, in one embodiment, step 504 is performed after the waiting period expires in step 502. In a different embodiment, however, step 504 can be performed immediately after step 500. The transmission control circuit can repeatedly perform step 504 to ensure the transmission does not undergo shift cycling. As described above, shift cycling can be disadvantageous to selecting the enhanced economy shift schedule because vehicle productivity can be negatively affected. For example, if the transmission downshifts from the higher gear range (which it shifted to in step 500) to the lower gear range, the average vehicle speed may decrease thereby affecting vehicle productivity.

Figure 6:
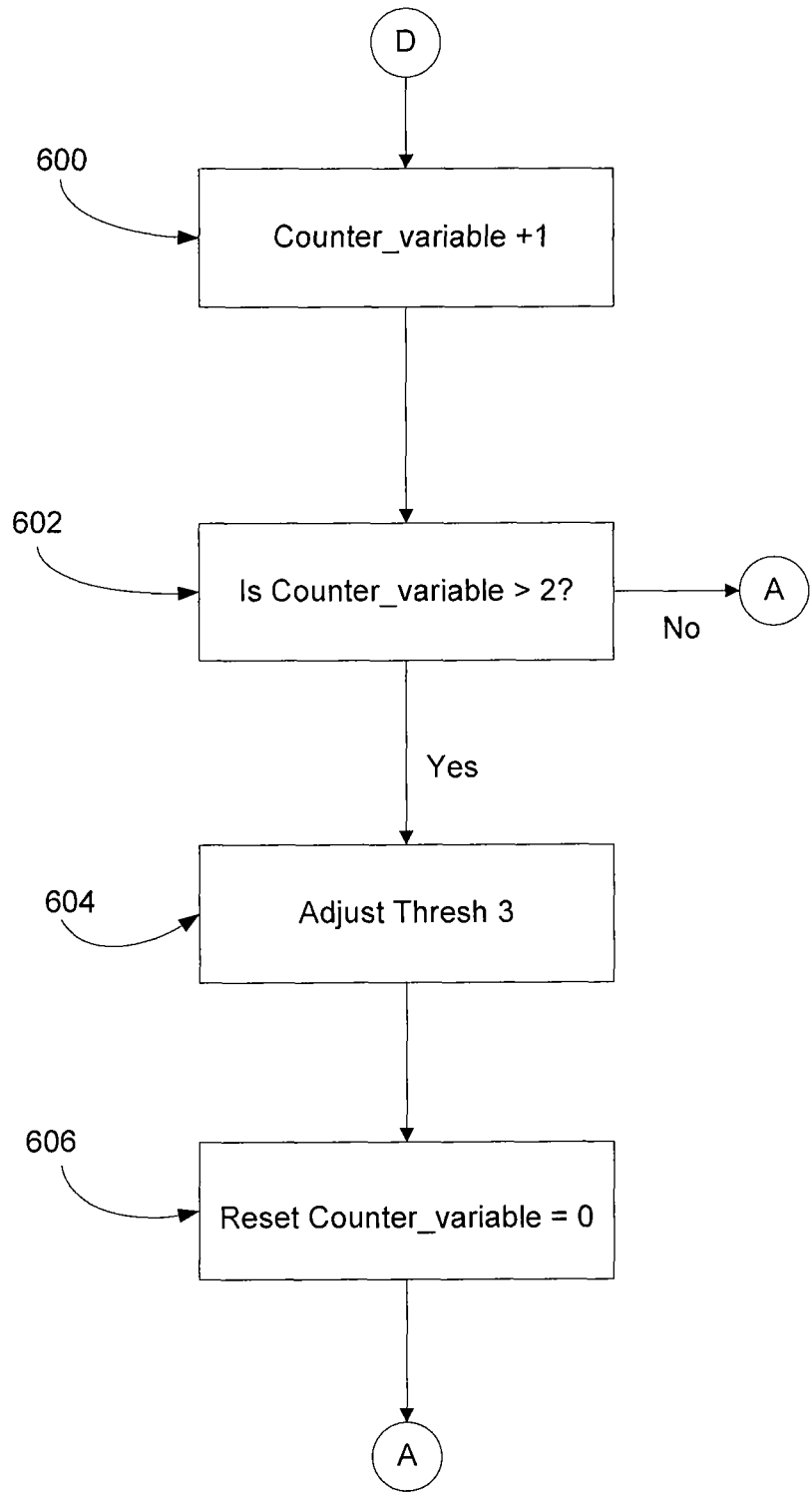
FIG. 6 is a flow chart of the embodiment of FIG. 3.

There can be different results if the transmission undergoes shift cycling. In one aspect, after the transmission control circuit determines the transmission shifted to a lower gear range (i.e., higher gear ratio), method 300 continues to step 600 (FIG. 6). In step 600, the transmission control circuit can activate a counter variable. The counter variable can be initially set at a value of zero by the enhanced economy shift schedule. However, in step 600, the counter variable is increased by an increment of one. Each time the transmission does a shift cycle from a lower gear ratio to a higher gear ratio, the value of the counter variable can be increased.

In step 602, the condition of the counter variable is tested. In this embodiment, when the counter variable exceeds two, i.e., the transmission downshifts from a lower gear ratio to a higher gear ratio more than two times, the condition in step 602 is satisfied and method 300 proceeds to step 604. If the condition is not met in step 602, the transmission control circuit can reselect the higher gear range (e.g., lower gear ratio) automatically (this step is not shown in FIG. 6) or it can repeat steps 302, 304, and 306 at the lower gear range. In the latter condition, the enhanced economy shift schedule is disabled until the conditions set forth in steps 400, 402, and 404 are satisfied.

If, however, the counter variable does satisfy the condition in step 602, method 300 continues to step 604 where the threshold value, Thresh 3, is reevaluated and/or adjusted. In step 604, for example, the constant value or threshold margin can be adjusted to prevent further shift cycling. In the previous example, the threshold margin was set at 1,000 Newton. If shift cycling is detected by the transmission control circuit, the threshold margin can be adjusted by 500 Newton, for example, to allow the transmission to operate in the enhanced economy shift schedule. If the transmission can continually operate in the enhanced economy shift schedule at the adjusted threshold margin without shift cycling, the transmission control circuit repeats method 300 to determine if the next higher gear range can be selected to further reduce engine speed and improve fuel savings. If, however, the transmission control circuit detects further shift cycling at the reduced threshold margin, the threshold margin can be further adjusted by 250 Newton, for example. Step 604 can be continuously performed until the threshold margin approaches 0 Newton and the current tractive effort force no longer is less than the maximum tractive effort force for the next higher gear range.

As shown in FIG. 6, after step 604 is completed, method 300 continues to step 606 in which the counter variable is reset. Step 606 can be optional, but in this embodiment it allows the transmission to downshift to a higher gear ratio at least twice (after Thresh 3 has been adjusted) before the transmission control circuit intervenes and determines whether to disable or deselect the enhanced economy shift schedule.

As described above, the transmission control module continuously performs method 300 regardless of whether the enhanced economy shift schedule has been selected. For instance, if the shift schedule has been selected and the transmission control circuit is controlling shifts according to the shift schedule, the control circuit continuously performs each step to further reduce engine speed and improve fuel efficiency until at least one of the conditions set forth in method 300 cannot be satisfied. Therefore, for a transmission having N automatically selectable gear ranges, the transmission control module can control an upshift from gear range N to gear range N+1. Once the shift to gear range N+1 is complete, the transmission control circuit will determine if the transmission can hold or maintain the gear range, and if so, the control circuit will perform method 300 again and determine if the transmission can shift to gear range N+2.

In one aspect of the present disclosure, once the enhanced economy shift schedule is selected, the conditions for disabling or deselecting the shift schedule can be made difficult to satisfy. This is particularly true if vehicle productivity is maintained and the transmission control circuit does not detect shift cycling. There are, however, several conditions that can cause the transmission control circuit to disable or deselect the enhanced economy shift schedule.

In one instance, the enhanced economy shift schedule can be disabled when there is a sudden drastic change in accelerator pedal position. As described above, the accelerator pedal position, or throttle percentage, is data that is transferred between the engine control circuit and the transmission control circuit via the data link. In other embodiments, there may be other means for receiving or determining accelerator pedal position. Although not shown in method 300, while the transmission operates according to the enhanced economy shift schedule, the transmission control circuit continuously monitors accelerator pedal position and compares it a threshold value (i.e., this is a different step and threshold value than described above relative to step 402). In this instance, the transmission control circuit is monitoring the change in accelerator pedal position. There can be a lag filter in place such that as accelerator pedal position is communicated to the transmission control circuit via the data link, a slow or moderate increase or change in accelerator pedal position will not trigger an alert or signal to the control circuit. In other words, the value of the current accelerator pedal position can be heavily filtered so that, unless the change in accelerator pedal position is sudden and drastic, the transmission control circuit will not disable the enhanced economy shift schedule.

If, for example, the accelerator pedal position changes from 10% throttle to 70% throttle in a short amount of time, the transmission control circuit may disable the shift schedule to enable the transmission performance to meet the intended desire of the vehicle operator. For practical purposes, a vehicle operator can ease into the accelerator pedal without the transmission control circuit disabling the enhanced economy shift schedule. Note, however, that if the vehicle operator eases off the accelerator pedal causing a decreasing change in accelerator pedal position, the transmission control circuit may not disable or deselect the shift schedule even if the change is sudden and/or drastic.

In another instance, the transmission control circuit may disable or deselect the enhanced economy shift schedule when the accelerator pedal is at a maximum position (e.g., 100% throttle) and vehicle acceleration is below a threshold value. In this instance, the vehicle may be ascending a steep grade pulling a heavy load. The accelerator pedal may be at its maximum position, but the vehicle may not be accelerating up the incline due to the steep grade and the vehicle's weight. Thus, the transmission control circuit will disable or deselect the enhanced economy shift mode and select a performance shift schedule, for example, to provide additional torque to ascend the steep grade.

If the transmission control circuit detects shift cycling, the enhanced economy shift schedule may be disabled or deselected. As described above, shift cycling can negatively impact vehicle productivity and therefore this is another condition in which the transmission control circuit can disable or deselect the enhanced economy shift schedule.

In another aspect, the transmission control circuit can disable or deselect the enhanced economy shift schedule if the required tractive effort force is substantially close to the maximum obtainable tractive effort force for the current gear range. In this condition, the amount of force at the tires of the vehicle is at or near the maximum amount of force obtainable at the tires in the current gear range. In other words, if the transmission control circuit determines that the required tractive effort is near the current maximum obtainable tractive effort force, the enhanced economy shift schedule will be disabled or deselected because the control circuit determines the grade or load cannot be held (i.e., failure to disable the enhanced economy shift schedule may result in a loss of vehicle speed and/or a downshift to a lower gear range).

Torsional limitations can also be incorporated into the enhanced economy shift schedule. These limitations can prevent the transmission control circuit from enabling or selecting the shift schedule, or when the shift schedule has already been selected, these limitations can cause the shift schedule to be deselected or exited therefrom. The torsional limitations, as shown in FIG. 2, can be instructions or rules for shifting from a lower gear range to a higher gear range that cannot be violated. In many instances, the torsional limitations are in place to protect the structural integrity of the transmission and its working parts.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for selecting an economy mode shift schedule for a motor vehicle, comprising:
    a transmission having a torque converter and a plurality of selectable gear ranges;
    a transmission control circuit including a control module having the economy mode shift schedule stored therein, the transmission control circuit configured to operably control the transmission;
    an engine control circuit configured to control operation of an engine, the engine being operably coupled to the transmission;
    a communication link configured to transfer information between the transmission control circuit and the engine control circuit;
    wherein, the control module further includes instructions stored therein for executably controlling the transmission control circuit to
    receive engine torque data from the communication link,
    calculate vehicle acceleration,
    determine an accelerator pedal position,
    determine a mode of the torque converter,
    compute a net tractive effort force of the vehicle,
    compare the vehicle acceleration to a first threshold, the accelerator pedal to a second threshold, and the net tractive effort force to a third threshold,
    select the economy mode shift schedule for the transmission based on the comparison; and
    control shifting between gear ranges of the transmission according to the economy mode shift schedule.

2. The system of claim 1, wherein the instructions stored in the control module include instructions that are executable by the transmission control circuit to determine the net tractive effort force as a function of the engine torque data, the gear ratio of a selected gear range, and the mode of the torque converter.

3. The system of claim 2, wherein the instructions stored in the control module further include instructions executable by the transmission control circuit to compute a ratio value of a rear axle and tire size of the vehicle and determine gear ratios for the selectable gear ranges of the transmission.

4. The system of claim 1, wherein the instructions stored in the control module further include instructions executable by the transmission control circuit for controlling a shift from a first gear range to a second gear range.

5. The system of claim 4, wherein the instructions stored in the control module further include instructions executable by the transmission control circuit to determine if, after the transmission shifts from the first gear range to the second gear range, the transmission shifts from the second gear range to the first gear range within a period of time.

6. The system of claim 1, wherein the third threshold comprises a maximum tractive effort force and a tractive effort threshold value.

7. The system of claim 6, wherein the instructions stored in the control module further include instructions executable by the transmission control circuit for adjusting the tractive effort threshold value.

8. A method of operating a motor vehicle at an optimal vehicle speed without negatively affecting vehicle productivity, the vehicle having an engine coupled to a transmission, comprising:
    (a) determining gear ratios of all gear ranges of the transmission;
    (b) receiving engine torque data as a function of engine speed for all gear ranges;

(c) calculating vehicle acceleration and determining accelerator pedal position;

(d) determining a net tractive effort force of the vehicle for a current gear range of the transmission;

(e) comparing the vehicle acceleration to a first threshold, the accelerator pedal position to a second threshold, and the net tractive effort force to a third threshold;

(f) enabling an enhance economy shift schedule only if the vehicle acceleration satisfies the first threshold, the accelerator pedal position satisfies the second threshold, and the net tractive effort force is less than the third threshold;

(g) selecting the enhanced economy mode shift schedule for the transmission based on the comparison; and (h) controlling shifting between one or more gear ranges of the transmission according to the enhanced economy mode shift schedule.

9. The method of claim 8, wherein the controlling shifting comprises determining if an upshift from a lower gear range to a higher gear range can be completed.

10. The method of claim 9, further comprising determining if, after the upshift from a lower gear range to a higher gear range is completed, the transmission downshifts from the higher range to the lower range within a period of time.

11. The method of claim 10, further comprising adjusting the third threshold when the transmission downshifts from the higher range to the lower range within the period of time.

12. The method of claim 8, wherein, when the enhanced economy mode shift schedule includes at least a first gear range having a first gear ratio, a second gear range having a second gear ratio, and a third gear range having a third gear ratio, the second gear ratio being less than the first gear ratio and the third gear ratio being less than the second gear ratio, the controlling shifting comprises shifting from the first gear range to the second gear range.

13. The method of claim 12, wherein, after the shifting from the first gear range to the second gear range, repeating steps (a)-(g).

14. The method of claim 13, further comprising shifting from the second gear range to the third gear range.

15. The method of claim 12, wherein the controlling shifting comprises shifting from the first gear range to the third gear range.

16. A method of selecting an economy mode shift schedule for a transmission having X selectable gear ranges and coupled to a powered vehicle, the transmission having a transmission control circuit and the vehicle having an engine control circuit for controlling an engine, comprising:

controlling the transmission according to a non-economy mode shift schedule;

calculating vehicle acceleration and a change in accelerator pedal position;

computing a net tractive effort force of the vehicle for a current gear range N of the transmission, where N<X;

determining a maximum tractive effort force for all upshift gear ranges, the upshift gear ranges comprising gear ranges N+1, N+2, . . . , and N+J, where J=X−N;

comparing the calculated vehicle acceleration to a first threshold, the calculated change in accelerator pedal position to a second threshold, and the net tractive effort force to each maximum tractive effort force;

discontinuing the controlling step; and selecting and controlling the transmission according to the economy mode shift schedule for the transmission based on the comparison.

17. The method of claim 16, further comprising controlling shifting between gear range N and one of the upshift gear ranges.

18. The method of claim 17, further comprising:

(a) determining which of the upshift gear ranges has a maximum tractive effort force greater than the net tractive effort force;

(b) for those upshift gear ranges satisfying the condition of step (a), calculating the difference between the maximum tractive effort force of those up shift gear ranges and the net tractive effort force; and (c) identifying the upshift gear range corresponding to the smallest difference calculated in step (b).

19. The method of claim 18, wherein the controlling step comprises shifting from gear range N to the upshift gear range identified in step (c).

20. The method of claim 19, further comprising determining if after the shift from gear range N to the upshift gear range, the transmission downshifts from the upshift gear range to gear range N within a period of time.

21. The method of claim 20, further comprising adjusting the maximum tractive effort force associated with the upshift gear range when the transmission downshifts from the upshift gear range to gear range N within the period of time.

22. The method of claim 18, wherein the controlling step comprises shifting from gear range N to upshift gear range L, where L is between N and M, and upshift gear range M corresponds to the upshift gear range identified in step (c).

23. The method of claim 16, further comprising adding a constant threshold value to each maximum tractive effort force.

* * * * *